United States Patent [19]
Shiroishi et al.

[11] Patent Number: 4,833,020
[45] Date of Patent: May 23, 1989

[54] MAGNETIC RECORDING MEDIUM

[75] Inventors: Yoshihiro Shiroishi, Hachiouji; Sadao Hishiyama, Sayama; Hiroyuki Suzuki, Kawasaki; Tomoyuki Ohno; Yoshibumi Matsuda, both of Kokubunji; Kazumasa Takagi, Tokyo; Yoshio Gobara, Hadano; Norikazu Tsumita, Kanagawa; Masaki Ohura; Masaaki Hayashi, both of Odawara, all of Japan

[73] Assignee: Hitachi, Ltd., Tokyo, Japan

[21] Appl. No.: 149,678

[22] Filed: Jan. 28, 1988

[30] Foreign Application Priority Data

Jan. 29, 1987 [JP] Japan ................... 62-17172

[51] Int. Cl.$^4$ .............................................. G11B 5/64
[52] U.S. Cl. .................... 428/336; 427/131; 427/132; 428/611; 428/686; 428/694; 428/900
[58] Field of Search ............... 428/694, 900, 326, 686, 428/611; 427/131, 132

[56] References Cited

U.S. PATENT DOCUMENTS

| | | | |
|---|---|---|---|
| 3,150,939 | 9/1964 | Wenner | 29/195 |
| 4,544,591 | 10/1985 | Uesaka et al. | 428/900 |
| 4,610,911 | 9/1986 | Opfer et al. | 428/900 |
| 4,652,499 | 3/1987 | Howard | 360/135 |
| 4,743,491 | 5/1988 | Asada et al. | 428/900 |

Primary Examiner—Paul J. Thibodeau
Attorney, Agent, or Firm—Antonelli, Terry & Wands

[57] ABSTRACT

In a magnetic recording medium including an underlayer and a magnetic layer formed sequentially on a substrate, the underlayer is composed of a composite underlayer having an at least two-layered structure, the underlayer on the side of the substrate is made of a material providing low modulation to the magnetic recording medium while the underlayer on the side of the magnetic layer is made of a material providing a high S/N ratio to the medium. This makes it possible to obtain a magnetic recording medium having low modulation and high S/N ratio.

30 Claims, 2 Drawing Sheets

MAGNETIC RECORDING MEDIUM

BACKGROUND OF THE INVENTION

This invention relates generally to a magnetic recording medium for use in magnetic disks, and the like. More particularly, the present invention relates to a magnetic recording medium which will be suitable for high density recording, has a high S/N (signal-to-noise) ratio but less fluctuation of reproduction output and has high performance and high reliability.

A magnetic recording medium using a metallic magnetic thin film for a magnetic layer has been proposed in the past as a magnetic recording medium for high density recording as disclosed, for example, in Japanese Patent Publication No. 33523/1979. Various methods such as sputtering, vacuum evaporation, plating, ion plating, ion beam sputtering, and so forth, are available as the method for forming this magnetic recording medium. Demands for high density recording have been increasing recently and attempts have been made to provide a continuous thin film medium using a metallic magnetic thin film for provide practical application.

However, the continuous thin film medium exhibits fluctuation called "modulation" in reproduction output, as discussed in F. A. Hill et al.; "J. Vac. Sci. Technol., A4(3), May/Jun 1986, pp. 547–549". This modulation occurs because the magnetic anisotropy develops in one direction of a disk so that when magnetic characteristics in a circumferential direction are taken into consideration, magnetic characteristics of a magnetic layer change from position to position of the disk, and this modulation is not desirable for practical application. It is known that the magnitude of modulation depends on the film deposition condition of the magnetic layer and underlayer as discussed in the article described above and modulation can be reduced by selecting a suitable film deposition condition. However, the article only makes mention of modulation but does not at all examine definite characteristics important for magnetic recording such as reproduction output, recording density, output noise characteristics (S/N ratio), and the like.

As to the read and write characteristics of a magnetic recording medium, on the other hand, it is known that a high S/N ratio can be accomplished by laminating NiP and Au or NiP and Cu on a substrate by plating to form an underlayer, as disclosed in Japanese Patent Laid-Open No. 157130/1980. It is also known from Japanese Patent Laid-Open No. 62825/1983 (corresponding to U.S. Pat. No. 4,610,911) that high coercive force can be accomplished by film-deposition continuously of Si and Bi as the underlayer on a substrate by vacuum evaporation, and forming further a Co-Ni alloy layer. Furthermore, Japanese Patent Laid-Open No. 111323/1985 teaches that satisfactory magnetic characteristics can be accomplished by forming continuously a Cr underlayer and a Co-Pt magnetic layer by sputtering. In all cases, it cannot be said that these prior art references sufficiently examine the uniformity of read and write characteristics such as modulation.

As described above, the prior art technique does not at all make any study of the optimization of overall read and write characteristics of a magnetic recording medium such as reproduction output change called modulation, the S/N ratio, recording density, and so forth.

SUMMARY OF THE INVENTION

It is therefore a primary object of the present invention to provide a magnetic recording medium capable of reading and writing with in a high recording density and having a high S/N ratio but less modulation.

In a magnetic recording medium consisting of at least an underlayer and a magnetic layer disposed on a non-magnetic substrate, the object of the invention described above can be accomplished by forming, as the underlayer, a composite underlayer consisting of at least two layers.

In this case, the composite underlayer is deposited under the following two conditions (1) and (2).

(1) The underlayer on the side of the substrate is made of at least one member selected from the group consisting of Zr, Si, Ti, Y, Sc, Al, C, Ge, Sb, Cu, and the like, the alloys of these elements, those alloys which are formed by adding up to 20 at %, and preferably up to 10 at %, of an element X other than these elements to the elements or their alloys described above, and at least one oxide selected from the group consisting of aluminum oxides (e.g. $Al_2O_3$), silicon oxides (e.g. $SiO_2$) and magnesium oxides (e.g. MgO). Furthermore, the underlayer on the side of the magnetic layer is made of at least one member selected from the group consisting of Cr, Mo, W, Ru, Os, Pd, V, Nb, Hf, Rh, Pt and Ir, the alloys of these elements and those alloys which are formed by adding up to 20 at %, and preferably up to 10 at %, of an element Z other than these elements to the elements or their alloys described above.

(2) Alternatively, the underlayer on the side of the substrate is made of at least one member selected from the group consisting of Zr, Si, Ti, Y, Sc, Al, C, Ge, Sb, Cu, etc, alloys of these elements, those alloys which are formed by adding up to 20 at % and preferably up to 10 at %, of the element X other than the elements described above to the elements or their alloys, and the group consisting of Cr, Mo, W, Ru, Os, Pd, V, Nb, Hf, Rh, Pt and Ir, alloys of these elements and those alloys which are formed by adding up to 20 at %, and preferably up to 10 at %, of the element Z other than the elements described above to the elements or their alloys, and the film of the selected material is formed under the condition which reduces modulation, such as by increasing a film deposition rate by sputtering and reducing a gas pressure at the time of film formation, for example, while the underlayer on the side of the magnetic layer is made of the same material as described above but the film of the selected material is formed under the condition which provides a high S/N ratio, such as by decreasing the film deposition rate and increasing the gas pressure at the time of film formation, for example.

In other words, the magnetic recording medium in accordance with the present invention includes at least the two-layered underlayer which consists of at least an underlayer on the side of substrate for reducing modulation and another layer on the side of the magnetic layer for improving the S/N ratio. The underlayer on the side of the magnetic layer is affected crystallographically by the underlayer on the side of the substrate and has less modulation.

Under the condition (1) described above, the element X is at least one element selected from the group consisting of Cr, Mo, W, Ru, Os, Pd, V, Nb, Hf, Rh, Pt, Ir and Ta while the element Z is at least one element selected from the group consisting of Zr, Si, Ti, Y, Sc, Al, C, Ge, Sb and Cu. If the amount of the element X is below 20 at % in total, the crystalline structure does not change due to addition of the element X and lattice matching with the underlayer on the magnetic layer side is good. If the amount of the element Z is below 20 at % in total, the crystalline structure does not change either due to addition, and lattice matching with the underlayer on the substrate side is good also.

Under the condition (2), the underlayer for reducing modulation can be obtained by increasing the film deposition rate and decreasing the gas pressure in the film deposition process by sputtering, but its definite condition varies with the apparatus used, the sample transfer speed, the film deposition method, and the like. Therefore, the most suitable film deposition rate and gas pressure for sputtering may be determined by experiments. Incidentally, the underlayer for reducing modulation is such a film whose crystal axes of crystal grains are not distributed concentratedly within a region below 90° in terms of an orientation angle in a film plane or, in other words, a film whose crystal axes can be regarded as substantially isotropic in the plane.

Accordingly, the film deposition rate and gas pressure providing such a film may be determined by experiments.

Under the condition (2), the underlayer for increasing the S/N ratio is obtained by decreasing the film deposition rate and increasing the gas pressure in the film deposition process by sputtering. In this case, too, the definite condition varies with the kind of magnetic material, the apparatus used, the sample transfer speed and the film deposition method. Therefore, the film deposition rate and gas pressure suitable for sputtering may be determined by experiments. Incidentally, the underlayer for improving the S/N ratio is the film which has a grain size of up to 1,000 Å and preferably up to 500 Å and is oriented so that its lattice matching with the magnetic film is high. Therefore, the film deposition rate and gas pressure providing such a film may be determined by experiments.

Furthermore, under the condition (2) described already, the condition which provides low modulation and high S/N ratio may be determined by forming the underlayer at various film deposition rates and gas pressures, then forming the magnetic layer thereon and measuring modulation and S/N ratio without metallographic observation.

Generally, the film deposition condition providing low modulation is such that supplied power of sputtering is preferably above 3 W/cm$^2$ and the argon gas pressure is preferably below 10 mTorr. On the other hand, the film deposition condition increasing the S/N ratio is generally such that the supplied power of sputtering is preferably below 3 W/cm$^2$ and the argon gas pressure is preferably above 10 mTorr. As described already, however, such preferred conditions for the film deposition rate and the gas pressure vary with the kind of the magnetic material, the apparatus used, the sample transfer speed, the film deposition method, and the like. For this reason, the range of the supplied power and argon gas pressure described above may vary with these factors.

When an underlayer having at least two layers is formed by the same material in the structure in item (2) described above, the boundary of each layer can be observed distinctly through observation of the cross-section of the magnetic disk by a scanning electron microscope (SEM).

The underlayer on the substrate side is preferably at least 50 Å-thick but up to 2,500 Å-thick. More preferably, its thickness is within the range of 100 to 1,000 Å. If the thickness of the underlayer on the substrate side is below 50 Å, the reduction of modulation is not sufficient and if it exceeds 2,500 Å, the drop of the S/N ratio is not negligible.

The film thickness of the underlayer disposed on the magnetic layer side is preferably within the range of from 100 to 5,000 Å and more preferably within the range of from 500 to 3,000 Å. If the film thickness is below 100 Å, the effect of the present invention described above is not sufficiently high and if it is above 5,000 Å, the effect of improving the S/N ratio tends to get saturated, and the cost of production increases also.

The magnetic layer constituting the magnetic recording medium of the present invention is preferably made of a single metal of Co, Ni or Fe or an alloy substantially consisting of Co, Ni or Fe from the aspect of improving the S/N ratio, and more preferably an alloy substantially consisting of Co. An alloy consisting of Co, Ni and Zr; Co, Ni and Ti; Co, Ni and Hf; Co, Cr and Zr; Co, Cr and Ti; or Co, Cr and Hf is preferable for the purpose of improving the corrosion resistance, whereby the concentration of Ti, Zr and Hf relative to the total amount of Co and Ni is from 0.1 at % to 20 at % in total and more preferably from 3 at % to 12 at %, and relative to the total amount of Co and Cr, from 6 wt % to 30 wt % in total and more preferably from 10 wt % to 25 wt %. The Ni content to Co is from 10 at % to 60 at % and more preferably, from 30 at % to 50 at % from the aspect of improving the S/N ratio, while the Cr content to Co is from 3 at % to 20 at % and more preferably, from 5 at % to 18 at %.

The film thickness of the magnetic layer may be within such a range which provides satisfactory magnetic characteristics and may be the same as that of the conventional magnetic recording medium. Ordinarily, however, a preferred range is from 100 to 1,000 Å and a more preferred range is from 300 to 800 Å.

As is well known in the art, corrosion resistance and wear resistance can be improved remarkably by disposing a non-magnetic coating layer as a protective lubricant film, which is from 100 to 1,000 Å-thick and preferably from 200 to 600 Å-thick, on the surface of the magnetic layer, and disposition of such a non-magnetic coating layer is extremely preferable for practical application. A film of $Al_2O_3$, $SiO_2$, organic protective lubricant materials, Rh, C, B, BN, SiC, etc, can be used as the non-magnetic coating layer.

The magnetic recording medium in accordance with the present invention may have the same structure as that of the conventional magnetic recording media, wherein the underlayer and the magnetic layer are disposed on the substrate, except that the underlayer consists of the composite underlayer as described already.

DESCRIPTION OF THE PREFERRED EMBODIMENTS

Figure 1:
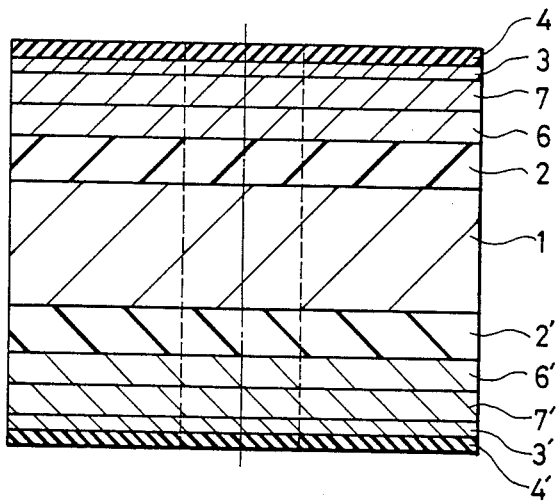
FIG. 1 is a schematic view showing the sectional structure of a magnetic disk in the first embodiment of the present invention.

The inventors of the present invention produced prototype magnetic disks by forming a 3,000 Å-thick Cr underlayer, a 600 Å-thick $Co_{0.65}Ni_{0.30}Zr_{0.05}$ magnetic layer and a 400 Å-thick C protective lubricant layer on a NiP-plated Al alloy substrate by an RF sputtering method while keeping a substrate temperature at 150° C. and changing an Ar gas pressure between 5 and 40 mTorr and supplied power between 0.5 and 15 w/cm², and then examined the read and write characteristics of the magnetic disks thus produced. As a result, it was found that recording density characteristics and the S/N ratio can be increased by increasing the Ar gas pressure and reducing the supplied power to reduce the film deposition rate at the time of film deposition but modulation increases. If the Ar gas pressure is reduced and the supplied power is increased to increase the film deposition rate, on the contrary, modulation can be reduced but the recording density characteristics as well as the S/N ratio drop, too. Furthermore, when the magnetic disk was produced tentatively by changing independently the film deposition conditions for the Cr underlayer and the magnetic layer and the read and write characteristics were evaluated, it was found that whereas modulation is determined by the film deposition condition of the Cr underlayer alone, the S/N ratio is determined by the film deposition conditions of both the Cr underlayer and the magnetic layer. When the crystalline structure was examined, the crystal grains of both the underlayer and the magnetic layer were fine grains of about 500 Å when high Ar gas pressure and low supplied power were employed for film deposition, and magnetic dispersion becomes small so that the magnetic transition region becomes narrow and the S/N ratio as well as the recording density characteristics can be improved. However, when crystalline orientation distribution in the film surface of both the Cr underlayer and the magnetic layer was evaluated by a pole figure method using X-rays in this case, the crystal grains of the magnetic layer which grow heteroepitaxially with the Cr underlayer grow with orientation in the plane because the crystal grains of the Cr underlayer are likely to grow with orientation in the plane, so that magnetic anisotropy develops in the magnetic disk and, consequently, a difference occurs in the magnetic characteristics in the circumferential direction, thereby causing modulation. This phenomenon was particularly remarkable when the underlayer was deposited at a high Ar gas pressure and low supplied power. Furthermore, this phenomenon was likewise observed when the Cr underlayer and the magnetic layer were formed while rotating the substrate at 30 rpm. When a similar evaluation was made by changing the film thickness of the Cr underlayer, it was found that growth morphology of the Cr initial underlayer on the substrate and its crystalline structure were of particular importance for controlling modulation.

The relationship between the film deposition condition and modulation vary with the film deposition apparatus used, the transfer method of the disk, the introduction method of the Ar gas at the time of sputtering and the residual gas components, or the film deposition system such as the RF sputtering method, the DC sputtering method, the vacuum evaporation method, the ion beam sputtering method, and the like. However, the relationship is always established in that excellent recording density characteristics and high S/N ratio can be obtained under a film deposition condition which provides high modulation while they are deteriorated under a film deposition condition which provides low modulation. The S/N ratio and modulation are determined by orientation of the crystal grains as described already. Moreover, this relationship is observed irrespective of the materials of the underlayer employed, such as Cr, Zr, Ru, Pd, V, Nb, Hf, Rh, Pt, and the like, and of the materials of the magnetic layers such as the Co-Ni, Co-Cr, Co-Re, Co-Pt, Co-Fe alloys, and the like.

Therefore, the inventors of the present invention formed the underlayer by an at least two-layered composite film and examined intensively the film deposition condition and material of each layer to clarify the conditions of the magnetic recording medium having low modulation and excellent recording density characteristics as well as high S/N ratio. As the material of the underlayer, the present inventors examined the simple substance material such as Sc, Y, Ti, Zr, Hf, V, Nb, Ta, Cr, Mo, W, Ru, Os, Rh, Ir, Pd, Pt, Cu, Ag, Au, C, Si, Ge, Sb, Bi and Al, and oxides such as $SiO_2$, MgO, $Al_2O_3$, TiO, ZnO and $ZrO_2$. Furthermore, the present inventors examined various film deposition methods such as RF sputtering, DC sputtering, vacuum evaporation, ion beam sputtering, and the like.

As a result, it has been clarified that a recording medium having a low modulation and a high S/N ratio can be provided if the underlayer on the substrate side is made of the material which is at least one element selected from the group consisting of Zr, Si, Ti, Y, Sc, Al, C, Ge, Sb and Cu or at least one alloy of these elements, or at least one alloy obtained by adding up to 20 at %, and preferably up to 10 at %, of an element other than the elements described above to these elements or to their alloys or at least one member selected from the group consisting of MgO, $Al_2O_3$ and $SiO_2$, while the underlayer on the magnetic layer side is made of the material which is at least one element selected from the group consisting of Cr, Mo, W, Ru, Os, Pd, V, Nb, Hf, Rh, Pt and Ir, or at least one alloy of these elements or at least one alloy obtained by adding up to 20 at %, and preferably up to 10 at %, of an element other than these elements to these elements or their alloys.

Here, the film deposition condition of the underlayer on the substrate side may be a condition which provides low modulation of the medium or a condition which provides a high S/N ratio. As the film deposition condition of the underlayer on the magnetic layer side, the condition providing a high S/N ratio is more preferred.

Alternatively, the inventors found that a magnetic recording medium which is excellent in all of modulation, S/N ratio and recording density can be obtained by using, as the material of the composite underlayer, at least one element selected from the group consisting of Zr, Si, Ti, Y, Sc, Al, C, Ge, Sb and Cu and the group consisting of Cr, Mo, W, Os, Ru, Pd, V, Nb, Hf, Rh, Ir and Pt or at least one alloy consisting of the element(s) described above as its principal component, and depositing the film under the film deposition condition providing small modulation and thereafter forming the underlayer on the substrate side by using the same material as described above but under the film deposition condition providing high S/N and excellent recording density characteristics.

According to any of the conditions described above, the crystalline structure of the initial underlayer growing on the substrate grows in such a manner as to be capable of being regarded substantially as isotropic growth in the film plane without being affected by external disturbance at the time of film deposition, and when the second underlayer and the magnetic layer are formed on the first underlayer under the condition providing the high S/N ratio and high density recording, the crystal grains of each layer grow epitaxially while maintaining substantially isotropy. This is clarified as a result of analysis by RHEED (Reflection High Energy Electron Defraction) method, sectional TEM (Transmission Electron Microscopic Structure) observation, X-ray diffraction method, nd so forth. Here, the effect described above is found greater when the material of the underlayer on the substrate side is different from that of the underlayer on the magnetic layer side.

Furthermore, if the film of the underlayer on the magnetic side is deposited by use of the material described above under the film deposition condition described above, the crystal grains, crystallinity and crystal orientation of the magnetic layer are controlled and the width of the magnetic transition region is reduced so that both the high S/N ratio and high recording density characteristics can be accomplished simultaneously.

The effect described above is remarkable when the underlayer on the substrate side is from 50 to 2,500 Å-thick and more remarkable when it is from 100 to 1,000 Å-thick. The effect is remarkable when the underlayer on the magnetic layer side is from 100 to 5,000 Å-thick and particularly remarkable when it is from 500 to 3,000 Å-thick. In this instance, freedom of the film deposition condition and characteristics are high when the material of each layer of the composite underlayer is changed and are hence preferable from the aspect of practical use. However, since the film deposition condition of each layer can be changed independently by making some contrivances to the structure of the apparatus used, there occurs no critical problem even when the underlayers are made of the same material as described above.

The effect of the underlayers described above is particularly remarkable when the magnetic layer is made of a magnetic alloy substantially consisting of Co, the underlayer on the substrate side is made of Zr, Si, Ti or Zr-, Si-, Ti-based alloy, the underlayer on the magnetic layer side is made of Cr and both the underlayers are deposited under the same film deposition condition (the film deposition condition of the Cr underlayer providing a high S/N to the recording medium) or when the underlayers are made of Cr, the underlayer on the substrate side is deposited under the film deposition condition providing low modulation to increase relatively the crystal grain while the underlayer on the magnetic layer side is deposited under the film deposition condition providing the high S/N ratio to prevent the grain growth. This is because since Co has large magnetic anisotropy, magnetic anisotropy is also great in Co based alloys such as Co-Ni, Co-Cr, Co-Re, Co-W, Co-Pt, Co-Fe, Co-Ti, and the like and moreover since these Co based alloys grow with good lattice matching with Cr and since Cr grows in turn with good lattice matching with Zr, Ti, Hf, Si, and the like, large magnetic anisotropy of the Co based alloys are reflected particularly effectively on the magnetic characteristics. Moreover, Cr, Zr, Ti, Hf, Si and the like are particularly preferable because they have high corrosion resistance.

The substrate may be made of organic materials such as polyimide and PET (polyethylene terephthalate), glass and ceramics. As the substrate of magnetic disks, however, a NiP-plated Al alloy substrate is preferable from the aspect of wear resistance and price. Furthermore, when corrosion resistance of the magnetic layer is taken into consideration, the Co based alloys such as Co-Ni-Zr, Co-Ni-Ti, Co-Ni-Hf, Co-Cr-Zr, Co-Cr-Ti and Co-Cr-Hf are more preferable among the Co based alloys. In order to obtain a high read output, it is preferred that the Ni concentration to Co is from 10 at % to 60 at % and the Cr concentration to Co is from 3 at % to 20 at %. This composition provides high coercive force. Moreover, the concentration of each of Ti, Zr and Hf is preferably from 0.1 at % to 20 at % to Co and Ni and more preferably from 3 at % to 12 at %, and from 6 wt % to 30 wt % and more preferably from 10 wt % to 25 wt %, to Co and Cr. If the amounts of addition of Zr, Ti and Hf are small, the effect of improving wear resistance is low and when they are great, saturation magnetization will drop. The magnetic layer is preferably from 100 to 1,000 Å-thick and more preferably from 300 to 800 Å-thick.

Furthermore, wear resistance can be improved remarkably by disposing substantially a non-magnetic coating layer which is made of $Al_2O_3$, $SiO_2$, an organic material, Rh, C, B, BN, SiC, or the like, on the surface of the magnetic layer and is from 100 to 1,000 Å-thick, more preferably from 200 to 2,600 Å-thick. It is possible to further form an organic protective lubricant layer on the nonmagnetic coating layer.

Hereinafter, preferred embodiments of the present invention will be described in further detail with reference to the accompanying drawings, wherein like reference numerals are used to identify like constituents or constituents having the same function.

Embodiment 1

As shown in FIG. 1, non-magnetic plating layers 2, 2' made of NiP, NiWP, or the like, are formed on a base body 1 made of Al-Mg alloy. First underlayers 6, 6' on the substrate side which are made of at least one member selected from the group consisting of Zr, Si, Ti, Y, Sc, Al, C, Ge, Sb, Cu and alloy of these elements, A($_2O_3$, $SiO_2$ and MgO and second underlayers 7, 7' on the magnetic layer side which are made of at least one member selected from the group consisting of Cr, Mo, W, Ru, Os, Pd, V, Nb, Hf, Rh, Pt, Ir and their alloys are then formed. Magnetic layers 3, 3' made of Co-Ni, Co-Cr, Co-Re, Co-Pt, Co-Ni-Zr, Co-Cr-Zr, Co-Ni-Ti, Co-Fe or Co-Cr-Ti are formed on the second underlayers 7, 7' and non-magnetic coating layers 4, 4' made of C, B, BN, SiC, $SiO_2$, Rh or a metal oxide are disposed on the magnetic layers 3, 3'.

This embodiment will be described in further detail. Non-magnetic 12 wt % P-Ni plating layers 2, 2' which are 15 μm thick are formed on an Al plate 1 which is 130 mm in outer diameter, 40 mm in inner diameter and 1.9 mm thick, in order to obtain a non-magnetic substrate. The 500 Å-thick first underlayers 6, 6' made of one member selected from the group consisting of Zr, Ti, Si, C, Ge and $SiO_2$ is deposited by RF sputtering on this substrate at a substrate temperature of 180° C., an Ar pressure of 15 mTorr and RF supplied power of 2 W/cm². Next, the 4,500 Å-thick second underlayers 7, 7' are formed on the first underlayers 6, 6' under the same condition and furthermore, the 600 Å-thick $Co_{0.65}Ni_{0.3}Zr_{0.05}$ magnetic layers 3, 3' are deposited under the same condition. Finally, the 400 Å-thick C non-magnetic coating layers 4, 4' are deposited under the same condition to obtain the magnetic disk. The read and write characteristics of these magnetic disks are evaluated by use of Mn-Zn ferrite ring head having an effective gap length of 0.6 μm at a relative speed of 20 m/s and a flying height of 0.2 μm, and Table 1 tabulates the read and write characteristics of the disks.

TABLE 1

| | Underlayer | | Read/write characteristics | | |
|---|---|---|---|---|---|
| | 1st under-layer | 2nd under-layer | $D_{50}$ (kFCI) | S/N | Modulation (%) |
| Sample No. | | | | | |
| 1 | Zr | Cr | 28.0 | 7.0 | 1 |
| 2 | Ti | Cr | 27.5 | 6.3 | 5 |
| 3 | Si | Cr | 27.8 | 6.3 | 4 |
| 4 | C | Cr | 26.5 | 6.1 | 3 |
| 5 | Ge | Cr | 26.1 | 6.0 | 4 |
| 6 | $SiO_2$ | Cr | 27.0 | 6.1 | 3 |
| Comparative example | | Cr | 27.4 | 6.0 | 13 |

It can be understood clearly from Table 1 that in comparison with the conventional magnetic disk of the comparative example which uses only a 5,000 Å-thick Cr single layer as the underlayer, all the magnetic disks of the sample Nos. 1 to 6 of this embodiment have low modulation and excellent half value recording density $D_{50}$ (a recording density at which the output is the half of the read output at a low frequency). Good read and write characteristics can be obtained particularly when Zr, Ti or Si is used as the material of the first underlayer on the substrate side and among others, the best characteristics can be obtained when Zr is used for the first underlayer.

It is confirmed by the X-ray diffraction method that the degree of (110) orientation of Cr is extremely high in the magnetic disks of the present invention and a value approximate to the double of the background can be obtained at the peak value. This effect can be obtained, too, when 3,000 Å-thick Cr is used as the second underlayer and 100 Å-thick Y, Sc, Al, C, Ge, Sb, Cu, MgO, $Al_2O_3$, $SiO_2$, Zr-10 at % Hf or Zr-10 at % Ti is used, but the S/N ratio is somewhat lower.

The first underlayers 6, 6' which are 100 Å-thick and made of Zr or Si or Ti are formed by DC sputtering on the NiP-plated Al alloy substrate at a substrate temperature of 200° C., an Ar gas pressure of 10 mTorr and supplied power of 4 W/cm². Next, the second underlayers 7, 7' which are 2,500 Å-thick and made of at least one member selected from the group consisting of Mo, W, Hf, Hf-10 % Zr, V and Nb are formed at the Ar gas pressure of 15 mTorr and supplied power of 2 W/cm². Furthermore, the 700 Å-thick $Co_{0.8}Cr_{0.15}Zr_{0.05}$ films 3, 3' are formed under the same condition as described above and the 400 Å-thick $SiO_2$ films 4, 4' are formed at the Ar gas pressure of 5 mTorr and supplied power of 8 W/cm². In this manner, a 90 mmφ magnetic disk is produced and its characteristics are evaluated. It is found that though the S/N ratio is deteriorated by about 10% when compared with the case where Cr is used as the second underlayer, modulation is as low as up to several percent and the overall characteristics are by far better than the case where the underlayer consists of a single layer. Though the same effect can be observed when Ir, Pt, Pd, Os, Ru, Rh and Pt-Rh alloy are used for the second underlayer, the underlayer becomes more expensive and is not economical.

The first underlayer on the substrate side which is 200 Å-thick and made of one member selected from the group consisting of Y, Sc, Al, C, Ge, Sb, MgO, $Al_2O_3$, $SiO_2$, Al-5 wt % Cu and Cu is formed on the NiP-plated Al alloy substrate at the substrate temperature of 100° C., the Ar gas pressure of 20 mTorr and supplied power of 5 W/cm², and the second underlayer which is 2,000 Å-thick and is made of one member selected from the group consisting of Mo, W, Hf-2 at % Zr, Hf, V, Nb, Ir, Pt, Pd, Os, Ru and Rh is formed under the same condition as described above. After 500 Å-thick $Co_{0.63}Ni_{0.3}0Ti_{0.07}$ is formed under the same condition, 400 Å-thick B is formed at the Ar gas pressure of 10 mTorr and supplied power of 7 W/cm² to produce a 220 mmφ magnetic disk. The disk thus produced exhibits the similar read and write characteristics to those of the disk described above.

Embodiment 2

The magnetic disk having the structure shown in FIG. 1 in accordance with another embodiment of the present invention will be described. The disk consists of a non-magnetic base body 1 made of an Al-Mg alloy or the like, non-magnetic plating layers 2, 2' made of NiP or NiWP, first underlayers 6, 6' on the substrate side made of one member selected from the group consisting of Zr, Si, Ti, Y, Sc, Al, C, Ge, Sb, Cu and Cr, Mo, W, Os, Ru, Pd, V, Nb, Hf, Rh, Ir, Pt and their alloys deposited under the condition providing low modulation, second underlayers 7, 7' made of the same material as the first underlayer 6, 6' and deposited under the condition providing a high S/N ratio, magnetic layers 3, 3' made of Co-Ni' Co-Cr, Co-Re, Co-V, Co-Pd, Co-Rh, Co-Mo, Co-W, Co-Ti, Co-Fe, Co-Ni-Zr, Co-Ni-Ti, Co-Cr-Zr, Co-Cr-Ti, Co-Ni-Cr, Co-Fe-Ni or the like and non-magnetic coating layers 4, 4' made of C, B, Rh, oxides of non magnetic films, $Al_2O_3$ or $SiO_2$.

The fabrication process of this magnetic disk is as follows. First of all, 10 μm-thick non-magnetic 11 wt % P-Ni plating layers 2, 2' are formed on a 2 mm-thick Al alloy plate having an outer diameter of 150 mmφ to obtain a non-magnetic substrate. Cr is then formed as the first underlayers 6, 6' in thickness of 0.005, 0.05, 0.25 and 0.4 μm on this non-magnetic substrate by RF sputtering at the substrate temperature of 150° C., the Ar gas pressure of 5 mTorr and supplied power of 5 W/cm², and then the second underlayers 7, 7' using Cr are formed in thickness of 0.495, 0.45, 0.25 and 0.1 μm at the Ar gas pressure of 15 mTorr and supplied power of 1.6 W/cm² so that the total thickness of the first and second underlayer is 0.5 μm. After the 450 Å-thick $Co_{0.45}Ni_{0.4}Zr_{0.05}$ magnetic layers 3, 3' are formed under the same condition as described above, the 400 Å-thick C non-magnetic coating layers 4, 4' are formed at the Ar gas pressure of 10 mTorr and supplied power of 3 W/cm² to complete the magnetic disk.

For comparison, a magnetic disk whose underlayer is a 0.5 μm thick Cr single layer formed at the Ar gas pressure of 5 mTorr and supplied power of 5.0 W/cm² and a magnetic disk whose layer is a 0.5 μm-thick Cr single layer formed at the Ar gas pressure of 15 mTorr and supplied power of 1.6 W/cm² are also produced to examine their performance. The magnetic layers 3, 3' and the non-magnetic layers 4, 4' are formed under the same condition as described above.

Figure 2:
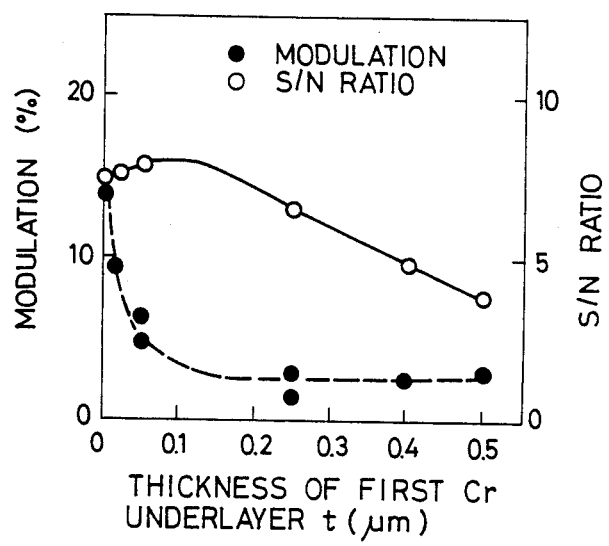
FIG. 2 is a diagram showing the relationship between modulation of the magnetic disk, the S/N ratio of the medium and the thickness of a Cr underlayer in the second embodiment of the present invention.

FIG. 2 shows the result when these magnetic disks are evaluated by use of a Mn-Zn ferrite head having an effective gap length of 0.4 μm at a relative speed of 14 m/s and a flying height of 0.2 μm. In this diagram, the abscissa represents the thickness of the first Cr underlayer and the thickness of the second Cr underlayer is the difference obtained by subtracting the thickness of the first underlayer from 0.5 μm.

When the Cr underlayers are deposited at 5 mTorr and 5.0 W/cm$^2$, modulation becomes low but the S/N ratio is low (corresponding to the case of the Cr underlayer thickness t=0.5 μm in FIG. 2). In contrast, when the Cr underlayer is formed at 15 mTorr and 1.6 W/cm$^2$, modulation is high but the S/N ratio becomes high because the crystal grains of the Cr underlayer and magnetic layer become as small as from 300 to 400 Å (corresponding to the case of t=0 μm in FIG. 2). In other words, in this embodiment, the first Cr underlayer is formed under the condition providing low modulation while the second Cr underlayer is formed under the condition providing the high S/N ratio.

In FIG. 2, when the thickness of the first Cr underlayer deposited under the condition providing low modulation (5 mTorr, 5.0 W/cm$^2$) is at least 0.005 μm thick, (110) orientation of Cr is high and modulation reduces drastically but since the crystal grains grow slowly, the S/N ratio becomes gradually low. When the underlayer has the two-layered structure as described above, the effects of reducing modulation and increasing the S/N ratio can be observed generally, but a more preferred result can be obtained if the first underlayer is from 50 Å (0.005 μm) to 2,500 Å (0.25 μm) thick because modulation reduces and the S/N ratio becomes high.

This relationship between the thickness of the underlayer and modulation and the S/N ratio also holds true of Embodiment 1.

Though the description given above deals with the case where the underlayer is made of Cr, substantially the same effect can be obtained when the underlayer is made of each element other than Cr. However, a particularly high S/N ratio can be obtained when Cr is used for the underlayer.

Embodiment 3

Still another embodiment of the present invention will be described.

First of all, a non-magnetic substrate is produced by forming a 20 μm-thick non-magnetic 13 wt % P-Ni plating layer on an Al alloy plate having an outer diameter of 220 mmφ and being 3 mm thick. A 100 Å-thick first underlayer which is made of one member selected from Zr, Zr-2 at % Hf, Si, Ti, Y, Sc, Al, C, Ge, Sb, Cu and Cr, Mo, W, Os, Ru, Pd, V, Nb, Hf, Rh, Ir and Pt is formed on the non-magnetic substrate by DC sputtering at a substrate temperature of 200° C., Ar pressure of 10 mTorr and 7 W/cm$^2$, and then a 2,500 Å-thick second underlayer is formed by the same material as the first underlayer at 10 mTorr and 3 W/cm$^2$ Thereafter, 500 Å-thick Co$_{0.5}$Ni$_{0.45}$ Ti$_{0.05}$ magnetic layer and 500 Å-thick C are formed under the same condition to obtain a magnetic disk. In this case, too, the magnetic disk exhibits excellent read and write characteristics having modulation below 10% and the S/N ratio of at least 6.

When B, Rh and SiO$_2$ are used, respectively, in place of C by sputtering, wear resistance is equivalent to that of the embodiment described above. Furthermore, when 5 to 200 Å-thick "Krytox" (a trade name of E. I. DuPont de Numours & Co.) consisting of perfluoroalkylpolyether is formed as an organic protective lubricant layer on the nonmagnetic coating layer, wear resistance as well as corrosion resistance can be further improved.

Embodiment 4

Figure 3:
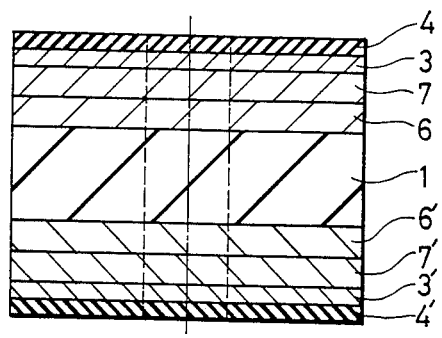
FIG. 3 is a schematic view showing the sectional structure of the magnetic disk in the fourth embodiment of the present invention.

FIG. 3 shows still another structure of the present invention.

As shown in the drawing, the magnetic disk of this embodiment consists of a non-magnetic substrate 1 made of glass, polyimide, ceramics, Al substrate subjected to anodic oxidation treatment or brass, first underlayers 6, 6' on the substrate side, second underlayers 7, 7' on the magnetic layer side, magnetic layers 3, 3', and organic protective lubricant layers or non-magnetic coating layers 4, 4' made of Rh, C, Si, Ge, SiC, B, BN, SiO$_2$, Al$_2$O$_3$, or the like.

This magnetic disk is produced in the following manner. First of all, 1,000 Å-thick Zr is deposited as the first underlayers 6, 6' by DC sputtering on the Al plate 1 which is 130 mmφ in outer diameter. 40 mmφ in inner diameter and 1.9 mm thick and subjected to anodic oxidation treatment, at a substrate temperature of 120° C., an Ar gas pressure of 15 mTorr and supplied power of 4 W/cm$^2$ and then 2,500 Å-thick Cr as the second underlayers 7, 7' is formed at the Ar gas pressure of 15 mTorr and 2 W/cm$^2$ Thereafter, °-A thick magnetic layers 3, 3' using one of the members selected from below are deposited at the Ar gas pressure of 15 mTorr and supplied power of 1.6 W/cm$^2$:

(Co$_{0.9}$Ni$_{0.1}$)$_{0.95}$Zr$_{0.05}$,
(Co$_{0.8}$Ni$_{0.2}$)$_{0.95}$Zr$_{0.05}$,
(Co$_{0.7}$Ni$_{0.3}$)$_{0.95}$Zr$_{0.05}$,
(Co$_{0.6}$Ni$_{0.4}$)$_{0.95}$Zr$_{0.05}$,
(Co$_{0.95}$Ni$_{0.05}$)$_{0.95}$Zr$_{0.05}$,
(Co$_{0.5}$Ni$_{0.5}$)$_{0.95}$Zr$_{0.05}$,
(Co$_{0.98}$Cr$_{0.02}$)$_{0.95}$Zr$_{0.05}$,
(Co$_{0.97}$Cr$_{0.03}$)$_{0.95}$Zr$_{0.05}$,
(Co$_{0.9}$Cr$_{0.1}$)$_{0.95}$Zr$_{0.05}$,
(Co$_{0.85}$Cr$_{0.15}$)$_{0.95}$Zr$_{0.05}$,
(Co$_{0.8}$Cr$_{0.2}$)$_{0.95}$Zr$_{0.05}$,
(Co$_{0.78}$Cr$_{0.22}$)$_{0.95}$Zr$_{0.05}$,

Thereafter, 300 Å-thick C is formed as the nonmagnetic coating layers 4, 4' at the Ar gas pressure of 15 mTorr and supplied power of 6 W/cm$^2$ to complete the magnetic disk.

When each of the magnetic disks thus produced is evaluated by a thin film magnetic head having a gap length of 0.4 μm, it exhibits good read and write characteristics having modulation below 5% and the S/N ratio of at least 6. When the S/N ratio is improved by setting the amounts of Ni and Cr with respect to Co to from 10 at % to 60 at % and from 3 at % to 20 at %, respectively, modulation and the S/N ratio are found to be below 5% and at least 7, respectively, and more excellent characteristics can be obtained.

When corrosion resistance of these magnetic disks is evaluated, it is found that corrosion resistance is improved remarkably because Zr is added. This effect is observed when at least 0.1 at % of Zr is added to the total amount of Co and Ni but when the amount is above 20 at %, however, read output drops undesirably. Similar effects of improving corrosion resistance are also observed for Ti and Hf. As to the Co-Cr alloy, the amount of each of Ti, Zr and Hf with respect to the total amount of Co and Cr is preferably from 6 wt % to 30 wt % and more preferably from 10 wt % to 25 wt %, and the latter range provides particularly excellent overall characteristics.

Embodiment 5

Figure 4:
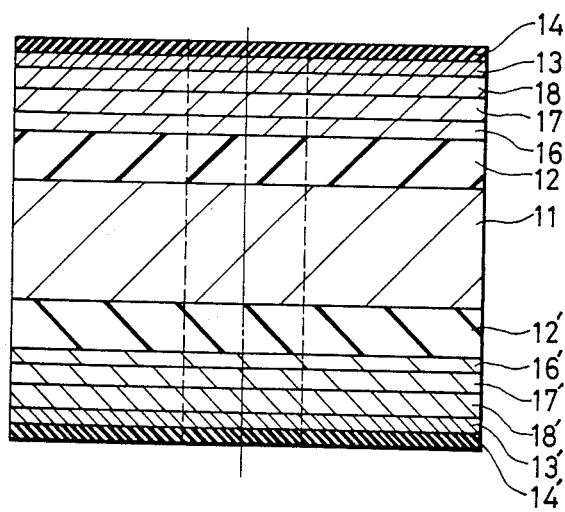
FIG. 4 is a schematic view showing the sectional structure of the magnetic disk in the fifth embodiment of the present invention.

FIG. 4 shows still another embodiment of the present invention.

The magnetic disk consists of a non-magnetic substrate 11, non-magnetic plating layers 12, 12', first underlayers 16, 16', second underlayers 17, 17', third underlayers 18, 18', magnetic layers 13, 13' and non-magnetic coating layers 14, 14' The first and second underlayers shown in FIGS. 1 and 3 correspond to the first and third underlayers of this embodiment, respectively. However, in accordance with this embodiment, the S/N ratio can be improved further by disposing the intermediate layers between them. The same non-magnetic material as used for the first or second underlayer in the foregoing Embodiments Nos. 1 through 4 can be used as the material of this intermediate layer or the second underlayers 17, 17'. Examples of such materials are Zr, Cr, $Al_2O_3$, $SiO_2$, or the like. The effect can be observed when the intermediate layer is at least 50 Å-thick but it is preferably up to 2,500 Å-thick from the aspect of production cost. Therefore, the intermediate layer is at least 50 Å-thick and preferably, up to 2,500 Å-thick.

In the embodiments of the present invention shown in FIGS. 1, 3 and 4, the non-magnetic coating layers need not always exist but if at least 100 Å-thick non-magnetic coating layers are deposited, wear resistance can be improved remarkably and for this reason, the non-magnetic coating layers are disposed preferably. However, if they are more than 1,000 Å-thick, a spacing loss will become great at the time of read and write and this is not preferable from the aspect of practical use.

Though the films are shown deposited on both sides of the magnetic disks in the foregoing embodiments, the same effect can be obtained even when the films are deposited on only one side of the substrate such as in the case of a tape or a stretched surface type disk.

In the foregoing embodiments, the films are deposited by sputtering, and vacuum evaporation, ion beam sputtering or the like may also be employed.

As described above in detail, the magnetic recording medium equipped with the composite underlayer in accordance with the present invention can provide a magnetic recording medium having extremely low modulation, a high S/N ratio, suitable for high density recording and having high performance and high reliability.

Although the invention has thus been described in some of its preferred forms, it can be understood by those skilled in the art that various changes or modifications can be made without departing from the scope and spirit thereof.

What is claimed is:

1. In a magnetic recording medium having a magnetic layer consisting of a metallic magnetic thin film formed on a non-magnetic surface of a substrate through an underlayer, the improvement wherein said underlayer is a composite underlayer having at least two non-magnetic layers consisting of an underlayer having a thickness of 50–2500 Å on the side of said substrate and an underlayer having a thickness of 100–500 Å on the side of said magnetic layer, said underlayer on the side of said substrate is made of a material providing low modulation to said magnetic recording medium and side underlayer on the side of said magnetic layer is formed on said underlayer on the side of said substrate either directly or through another underlayer and is made of a material providing a high S/N ratio to said magnetic recording medium, wherein said underlayer on the side of said substrate is made of at least one element selected from the group consisting of Zr, Si, Ti, Y, Sc, Al, C, Ge, Sb and Cu or at least one oxide selected from the group consisting of aluminum oxide, silicon oxide and magnesium oxide, and said underlayer on the side of said magnetic layer is made of at least one element selected from the group consisting of Cr, Mo, W, Ru, Os, Pd, V, Nb, Hf, Rh, Pt and Ir; or wherein both of said underlayers on the sides of said substrate and said magnetic layer are made of the same material which is at least one element selected from the group consisting of Zr, Si, Ti, Y, Sc, Al, C, Ge, Sb and Cu or the group consisting of Cr, Mo, W, Ru, Os, Pd, v, Nb, Hf, Rh, Pt and Ir, said underlayer on the side of said substrate is deposited under a condition providing low modulation and said underlayer on the side of said magnetic layer is deposited under the condition providing a high S/N ratio.

2. A magnetic recording medium according to claim 1, wherein said underlayer on the side of said substrate is made of at least one element selected from the group consisting of Zr, Si, Ti, Y, Sc, Al, C, Ge, Sb and Cu or at least one oxide selected from the group consisting of aluminum oxide, silicon oxide and magnesium oxide, and said underlayer on the side of said magnetic layer is made of at least one element selected from the group consisting of Cr, Mo, W, Ru, Os, Pd, V, Nb, Hf, Rh, Pt and Ir.

3. A magnetic recording medium according to claim 1, wherein both of said underlayers on the sides of said substrate and said magnetic layer are made of the same material which is at least one element selected from the group consisting of Zr, Si, Ti, Y, Sc, Al, C, Ge, Sb and Cu or the group consisting of Cr, Mo, W, Ru, Os, Pd, V, Nb, Hf, Rh, Pt and Ir, said underlayer on the side of said substrate is deposited under the condition providing low modulation and said underlayer on the side of said magnetic layer is deposited under the condition providing a high S/N ratio.

4. A magnetic recording medium according to claim 2, wherein said underlayer on the side of said substrate is made of an alloy prepared by adding up to 20 at % of at least one element selected from the group consisting of Cr, Mo, W, Ru, Os, Pd, V, Nb, Hf, Rh, Pt, Ir and Ta to at least one element selected from the group consisting of Zr, Si, Ti, Y, Sc, Al, C, Ge, Sb and Cu.

5. A magnetic recording medium according to claim 2, wherein said underlayer on the side of said magnetic layer is made of an alloy containing further up to 20 at % of at least one element selected from the group consisting of Zr, Si, Ti, Y, Sc, Al, C, Ge, Sb and Cu.

6. A magnetic recording medium according to claim 4, wherein said underlayer on the side of said magnetic layer is made of an alloy containing up to 20 at % of at least one element selected from the group consisting of Zr, Si, Ti, Y, Sc, Al, C, Ge, Sb and Cu.

7. A magnetic recording medium according to claim 3, wherein both of said underlayers on the sides of said substrate and said magnetic layer are made of an alloy prepared by adding up to 20 at % of at least one element selected from the group consisting of Cr, Mo, W, Ru, Os, Pd, V, Nb, Hf, Rh, Pt, Ir and Ta to at least one element selected from the group consisting of Zr, Si, Ti, Y, Sc, Al, C, Ge, Sb and Cu; or an alloy prepared by adding up to 20 at % of at least one element selected from the group consisting of Zr, Si, Ti, Y, Sc, Al, C, Ge, Sb and Cu to at least one element selected from the group consisting of Cr, Mo, W, Ru, Os, Pd, V, Nb, Hf, Rh, Pt and Ir.

8. A magnetic recording medium according to claim 2, wherein said underlayer on the side of said substrate is made of at least one selected from the group consisting of Zr, Si, Ti, Zr-, Si- and Ti-based alloy, and said underlayer on the side of said magnetic layer is made of Cr or a Cr-based alloy.

9. A magnetic recording medium according to claim 3, wherein both of said underlayers on the sides of said substrate and said magnetic layer are made of Cr or a Cr-based alloy.

10. A magnetic recording medium according to claim 1, wherein said non-magnetic substrate is a substrate produced by plating an Al alloy base by NiP.

11. A magnetic recording medium according to claim 1, wherein said magnetic layer is made of Co or Co-based alloy.

12. A magnetic recording medium according to claim 1, wherein said magnetic layer is made of a composition prepared by adding 0.1 to 20 at % of at least one element selected from the group consisting of Zr, Ti and Hf to a Co-Ni alloy containing 10 to 60 at % of Ni with respect to Co, on the basis of the total amount of Co and Ni.

13. A magnetic recording medium according to claim 1, wherein said magnetic layer is made of a composition prepared by adding 3 to 12 at % of at least one element selected from the group consisting of Zr, Ti and Hf to a Co-Ni alloy containing 30 to 50 at % of Ni with respect to Co, on the basis of the total amount of Co and Ni.

14. A magnetic recording medium according to claim 1, wherein said magnetic layer is made of a composition prepared by adding 6 to 30 wt % of at least one element selected from the group consisting of Zr, Ti and Hf to a Co-Cr alloy containing 3 to 20 at % of Cr with respect to Co, on the basis of the total amount of Co and Cr.

15. A magnetic recording medium according to claim 1, wherein said magnetic layer is made of a composition prepared by adding 10 to 25 wt % of at least one element selected from the group consisting of Zr, Ti and Hf to a Co-Cr alloy containing 5 to 18 at % of Cr with respect to Co, on the basis of the total amount of Co and Cr.

16. A magnetic recording medium according to claim 1, wherein said underlayer on the side of said substrate is from 100 to 1,000 Å-thick.

17. A magnetic recording medium according to claim 1, wherein said underlayer on the side of said magnetic layer is from 500 to 3,000 Å-thick.

18. A magnetic recording medium according to claim 1, wherein said magnetic layer is from 100 to 1,000 Å-thick.

19. A magnetic recording medium according to claim 1, wherein said magnetic layer is from 300 to 800 Å-thick.

20. A magnetic recording medium according to claim 1, wherein a non-magnetic coating layer which is from 100 to 1,000 Å-thick is disposed on the surface of said magnetic layer as a protective lubricant layer.

21. A magnetic recording medium according to claim 1, wherein a non-magnetic coating layer which is from 200 to 600 Å-thick is disposed on the surface of said magnetic layer as a protective lubricant layer.

22. A magnetic recording medium according to claim 1, wherein a non-magnetic intermediate layer is disposed between said underlayer on the side of said substrate and said underlayer on the side of said magnetic layer.

23. A magnetic recording medium comprising:
a substrate, at least one major surface of which is a non-magnetic surface;
a composite underlayer provided on said one major surface of said substrate, wherein said composite underlayer comprises a first underlayer provided on said one major surface of said substrate and a second underlayer provided over said first underlayer; and
a metallic magnetic thin film provided on said composite underlayer;
wherein said first underlayer is made of at least one element selected from the group consisting of Zr, Si, Ti, Y, Sc, Al, C, Ge, Sb and Cu, or is made of an alloy formed by adding up to 20 at % of at least one element selected from the group consisting of Cr, Mo, W, Ru, Os, Pd, V, Nb, Hf, Rh, Pt, Ir and Ta to at least one element selected from the group consisting of Zr, Si, Ti, Y, Sc, Al, C, Ge, Sb and Cu, or is made of at least one oxide selected from the group consisting of aluminum oxide, silicon oxide and magnesium oxide, has a thickness of 50–2500 Å, and provides low modulation to said magnetic recording medium; and
wherein said second underlayer is made of at least one member selected from the group consisting of Cr, Mo, W, Ru, Os, Pd, V, Nb, Hf, Rh, Pt and Ir, or is made of an alloy formed by adding up to 20 at % of at least one element selected from the group consisting of Zr, Si, Ti, Y, Sc, Al, C, Ge, Sb and Cu to at least one element selected from the group consisting of Cr, Mo, W, Ru, Os, Pd, V, Nb, Hf, Rh, Pt and Ir, has a thickness of 100–5000 Å, and provides a high S/N ratio to said magnetic recording medium.

24. A magnetic recording medium according to claim 23, wherein said first underlayer has crystal axes which are substantially isotropic in a plane of said first underlayer.

25. A magnetic recording medium according to claim 23, wherein said second underlayer has a grain size of up to 1000 ° and is oriented so as to have high lattice matching with said metallic magnetic thin film.

26. A magnetic recording medium comprising:
a substrate, at least one major surface of which is a non-magnetic surface;
a composite underlayer provided on said one major surface of said substrate, wherein said composite underlayer comprises a first underlayer provided on said one major surface of said substrate and a second underlayer provided over said first underlayer; and
a metallic magnetic thin film provided on said composite underlayer;
wherein each of said first underlayer and said second underlayer are made of the same material which is at least one element selected from the group consisting of Zr, Si, Ti, Y, Sc, Al, C, Ge, Sb and Cu, or is an alloy formed by adding up to 20 at % of at least one element selected from the group consisting of Cr, Mo, W, Ru, Os, Pd, V, Nb, Hf, Rh, Pt, Ir and Ta to at least one element selected from the group consisting of Zr, Si, Ti, Y, Sc, Al, C, Ge, Sb and Cu, or is at least one element selected from the group consisting of Cr, Mo, W, Ru, Os, Pd, V, Nb, Hf, Rh, Pt and Ir, or is an alloy formed by adding up to 20 at % of at least one element selected from the group consisting of Zr, Si, Ti, Y, Sc, Al, C, Ge, Sb and Cu to at least one element selected from the group consisting of Cr, Mo, W, Ru, Os, Pd, V, Nb, Hf, Rh, Pt and Ir;

wherein said first underlayer has a thickness of 50–2500 Å, and said second underlayer has a thickness of 100–5000 Å; and wherein said first underlayer is deposited under a condition providing low modulation and said second underlayer is deposited under a condition providing a high S/N ratio.

27. A magnetic recording medium according to claim 26, wherein said first underlayer has crystal axes which are substantially isotropic in a plane of said first underlayer.

28. A magnetic recording medium according to claim 26, wherein said second underlayer has a grain size of up to 1000 Å and is oriented so as to have high lattice matching with said metallic magnetic thin film.

29. A magnetic recording medium according to claim 26, wherein each of said first and second underlayers are formed by sputtering, and wherein said first underlayer is formed at a higher film deposition rate and a lower gas pressure than that at which said second underlayer is formed.

30. A magnetic recording medium according to claim 29, wherein said first underlayer is formed by sputtering with a supplied power above 3W/cm$^2$ and argon gas pressure below 10 mTorr, and said second underlayer is formed by sputtering with a supplied power below 3 W/cm$^2$ and an argon gas pressure above 10 mTorr.

* * * * *